United States Patent
Steinmetz et al.

(10) Patent No.: US 6,669,160 B2
(45) Date of Patent: Dec. 30, 2003

(54) THERMOMETER BASE

(75) Inventors: William L. Steinmetz, 1439 Golf Ter., Danville, IL (US) 61832; Gordon J. Waligorski, Delphi, IN (US); Robert J. Kennedy, Lafayette, IN (US)

(73) Assignee: William L. Steinmetz, Danville, IL (US)

( * ) Notice: Subject to any disclaimer, the term of this patent is extended or adjusted under 35 U.S.C. 154(b) by 0 days.

(21) Appl. No.: 10/072,118

(22) Filed: Feb. 7, 2002

(65) Prior Publication Data
US 2003/0146360 A1 Aug. 7, 2003

(51) Int. Cl.[7] .................. A47B 91/00; A47G 29/00; F16B 7/08
(52) U.S. Cl. .............. 248/346.01; 248/346.5; 248/346.04; 248/638; 248/636; 248/519; 403/187; 403/188
(58) Field of Search ............ 248/346.01, 519, 248/311.2, 314, 310, 346.5, 346.04, 638, 636; 403/187, 188, 192, 199, 200

(56) References Cited

U.S. PATENT DOCUMENTS

| | | | | |
|---|---|---|---|---|
| 2,004,627 A | * | 6/1935 | Hoeflich | 374/194 |
| 2,704,663 A | * | 3/1955 | Blake | 267/151 |
| 3,117,485 A | * | 1/1964 | Jansen | 411/427 |
| 3,573,401 A | * | 4/1971 | Lininger | 381/363 |
| 4,031,904 A | * | 6/1977 | Karl | 131/173 |
| 5,002,251 A | * | 3/1991 | Kranenberg | 248/503 |
| 5,564,665 A | * | 10/1996 | Resnick | 248/519 |
| 5,909,008 A | * | 6/1999 | Pelaez | 174/138 G |

* cited by examiner

Primary Examiner—Kimberly Wood
(74) Attorney, Agent, or Firm—Brian D. Smith, P.C.

(57) ABSTRACT

An assembly is disclosed for protecting and supporting a fragile thermometer having a column and an integral flange base. The assembly includes a support base defining a threaded bore for receiving the integral flange base of the thermometer. A bottom cushioning pad is also provided for placement in the bottom of the bore. In addition, a ring-shaped upper cushioning pad is provided for being fitted over the column of the thermometer and against the top surface of the thermometer's flange base. The thermometer is secured to the protective support base with a threaded collar member which receives the thermometer column and is threaded into the threaded bore of the support base which secures the thermometer to the base. An adapter bushing may also be used to attach thermometers having smaller diameter columns to the base. The bushing is received in the threaded collar member and defines an axially aligned hole having a predetermined diameter for closely receiving the column of a thermometer having a small diameter.

11 Claims, 2 Drawing Sheets

THERMOMETER BASE

TECHNICAL FIELD OF THE INVENTION

The invention relates generally to support bases for elongated members and, more particularly, to support base assemblies for fragile elongated members having integral flange bases such as Galileo thermometers.

BACKGROUND OF THE INVENTION

Despite their expense, glass column Galileo style thermometers have become extremely popular with the public because of their unique shape, interesting visual effects and of course, their functionality. However, they are extremely fragile not just because they are made from glass but also because they have an integral small diameter flange base that offers very little support and allows the thermometer to tip over and break very easily.

DISCLOSURE OF THE INVENTION

The present invention addresses the aforementioned problem by providing a protective base assembly for glass column Galileo style thermometers which protects and supports the thermometer or any similar type elongated member having a column and an integral flange base in which the base has a bottom surface and a top surface with the column projecting upwardly therefrom. The protective base assembly includes a protective support base defining a threaded bore for receiving the integral flange base of the thermometer or fragile elongated member. A bottom cushioning pad is also provided which is placed in the bottom of the threaded bore. The bottom pad cushions and supports the flange base of the thermometer when it is placed in the threaded bore with its bottom surface positioned against the bottom pad. A ring-shaped upper cushioning pad is also provided which is placed on the top surface of the thermometer's flange base by fitting it over the thermometer's column and positioning it against the top surface of the thermometer's flange so that the column located in the ring hole of the pad. In addition, a threaded collar member for being threaded into the threaded bore of the protective support base is provided. The threaded collar member defines an axially aligned hole for receiving the thermometer column. The collar member secures the thermometer to the protective support base when it is fitted over the thermometer's column, i.e. with the column received in the collar's axially aligned hole, and then is threaded into the support base's threaded bore.

The assembly is also preferably provided with a plurality of differently sized adapter bushings for protecting and accommodating thermometers having smaller diameter columns. Each adapter bushing has a flange portion and a cylindrical portion. The cylindrical portion is received in the axially aligned hole of the threaded collar member so that its flange portion is positioned between the collar member and the upper ring-shaped cushioning pad placed on the top surface of the thermometer's flange base. Each bushing also defines an axially aligned hole having a predetermined diameter for closely receiving the column of a thermometer having a diameter slightly less than the bushing's predetermined diameter. This close receiving or fitting is desirable because it enhances securement of the thermometer to the protective support base.

The bushing's flange portion is also provided with a thickness that serves to slightly compress the upper and bottom cushioning pads against the thermometer's flange base when the collar is threaded into the threaded bore of the protective base. Pad compression is desirable because it cushions the thermometer's flange base and prevents the flange base from moving or sliding around in the threaded bore of the protective base. This enhances securement of the thermometer to the protective base and also protects the thermometer should it happen to be bumped or knocked over.

The present invention also provides a unique wall mounting bracket for mounting the protective base and supported thermometer on a wall.

BRIEF DESCRIPTION OF THE DRAWINGS

The invention will be more readily understood by reference to the accompanying drawings wherein like reference numerals indicate like elements, and in which.

DETAILED DESCRIPTION OF THE PREFERRED EMBODIMENT

Figures 1, 2:
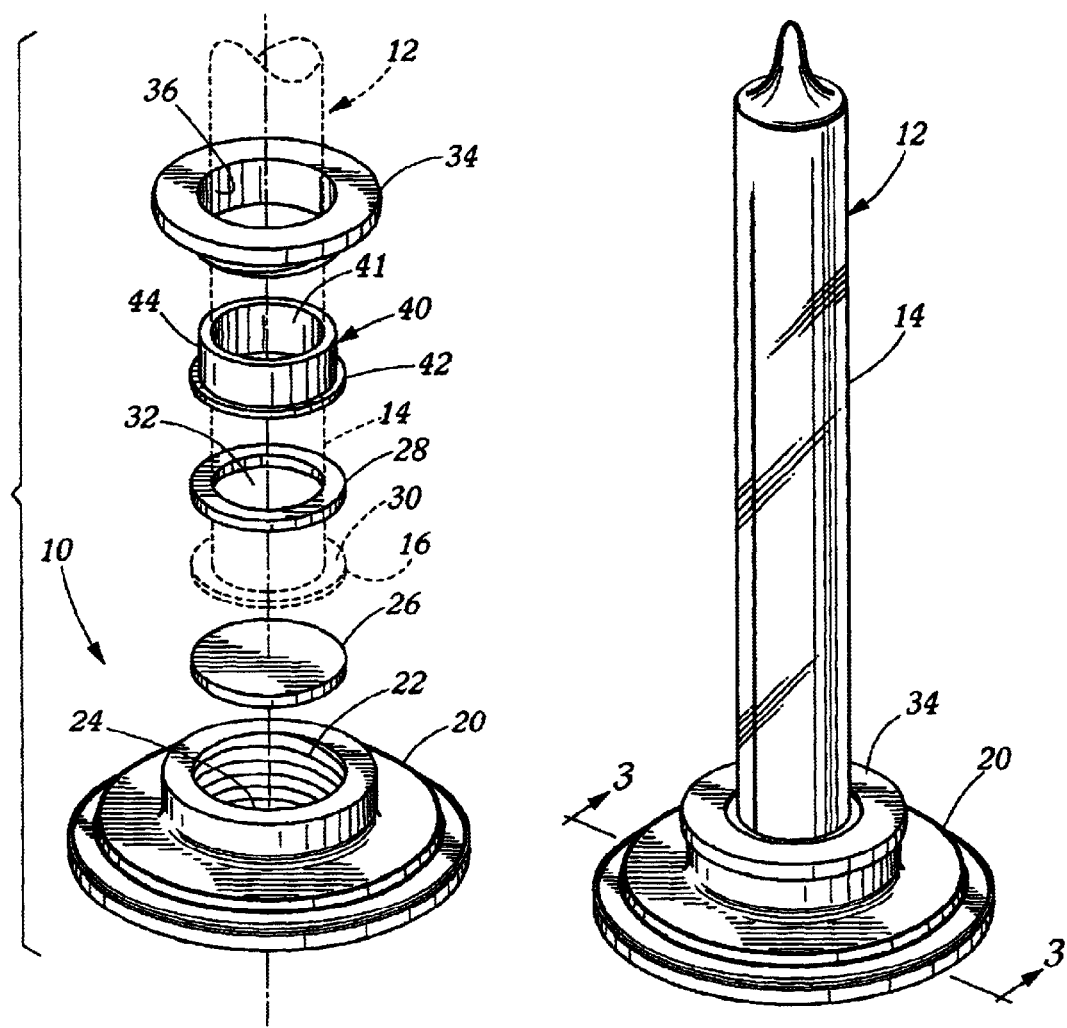
FIG. 1 is an exploded perspective view of the base assembly of the present invention for supporting a thermometer shown in dotted line having a column and an integral flange.
FIG. 2 is a perspective view showing the base assembly of FIG. 1 after it has been assembled to support the thermometer of FIG. 1.
Figure 3:
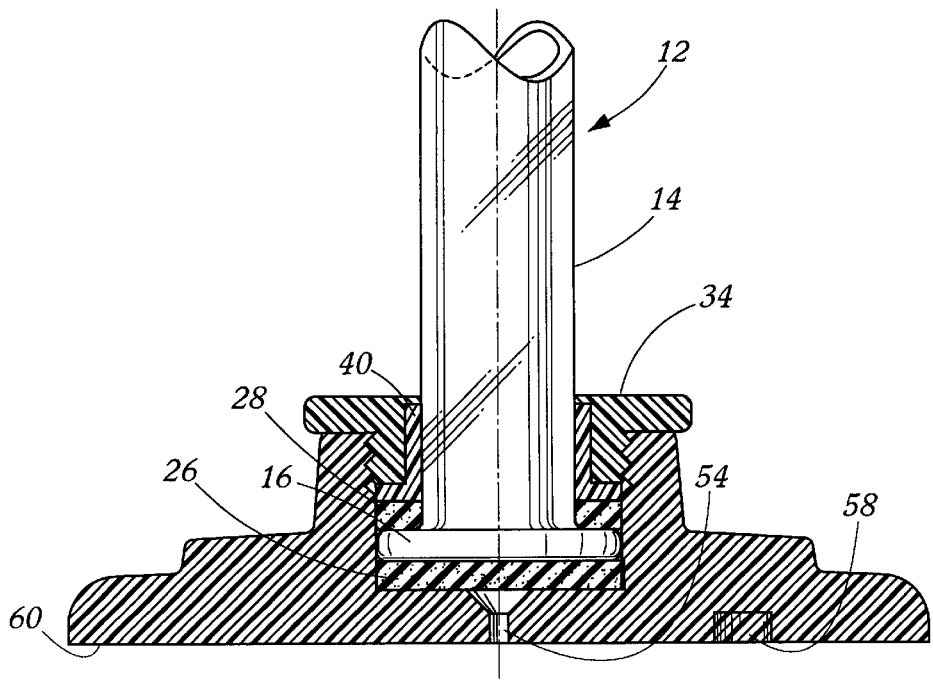
FIG. 3 is a cross sectional view taken along lines 3—3 of FIG. 2.

FIGS. 1 through 3 illustrate a unique base assembly 10 of the present invention for protecting and supporting a Galileo thermometer 12 or a similar fragile elongated member having a column 14 and an integral flange base 16. The base assembly includes a protective support base 20 defining a threaded bore 22 having a bottom 24. A bottom cushioning pad 26 is also provided for placement in bottom 24 of bore 22. The bottom pad 26 cushions and supports the thermometer's flange base 16 when it is received in bore 22 with its bottom surface (not numbered) positioned against bottom pad 26 as best shown in FIG. 3.

The assembly also includes a ring-shaped upper cushioning pad 28 which as best visualized from the exploded view of FIG. 1 is placed on the top surface 30 of the thermometer's flange base 16 by fitting it over the thermometer's column 14 and positioning it against surface 30 so that the thermometer's column 14 is located in the ring hole 32 of the pad. In addition, a threaded collar member 34 is provided for being threaded into the threaded bore 22 of support base 20. The threaded collar member defines an axially aligned hole 36 for receiving the thermometer column 14 or an adaptor bushing 40 as shown in the drawings which in turn defines an axially aligned hole 41 for receiving the thermometer column. The collar member secures the thermometer to the protective support base when it is fitted over the thermometer's column, i.e. with the column received in the collar's axially aligned hole, and then is threaded into the support base's threaded bore.

Adapter bushing 40 as shown in the drawings has a flange portion 42 and a cylindrical portion 44. The cylindrical portion is received in the axially aligned hole 36 of the threaded collar member 34 so that its flange portion 42 is positioned between the collar member 34 and the upper pad 28 as shown in FIG. 3. The bushing's axially aligned hole 41 is preferably provided with a predetermined diameter for closely receiving the column of a thermometer having a diameter slightly less than the bushing's predetermined diameter. This close receipt or fitting is desirable because it enhances securement of the thermometer to the protective support base.

The bushing's flange portion 42 is also provided with a thickness that serves to slightly compress the upper and bottom cushioning pads against the thermometer's flange base when the collar member 34 is threaded into the threaded bore of the protective base. Pad compression is desirable because it cushions the thermometer's flange base and prevents the flange base from moving or sliding around in the threaded bore of the protective base. This enhances securement of the thermometer to the protective base and also protects the thermometer should it happen to be bumped or knocked over.

In the preferred embodiment, the assembly is provided with a plurality of differently sized adapter bushings 40 for protecting and accommodating thermometers having columns of different diameters.

To use assembly 10 to protect and support a Galileo thermometer 12 or other fragile elongated member having a column 14 and an integral flange base 16, one places the assembly's bottom cushioning pad 26 in the bottom 24 of the support base's bore 22 and fits the ring-shaped upper cushioning pad 28 over the thermometer's column 14 so that the column is located in the pad's ring hole 32 and the pad is positioned against the top surface of the thermometer's flange. The thermometer's flange base 16 is then inserted in the threaded bore 22 of the support base 20 so that the flange base's bottom surface is positioned against the bottom cushioning pad 26 placed in the bottom of the threaded bore 22. The threaded collar member 34 is then fitted over the thermometer's column 14 so that the column is located in the collar member's axially aligned hole 36 and then the threaded collar member is threaded into the support base's threaded bore to secure the thermometer member to the protective support base.

If a thermometer having a small diameter column is to be inserted into the support base, it may be desirable to use an adapter bushing 40 having a diameter which closely receives the thermometer column to insure that the thermometer is securely attached to the base. To use the adapter bushing, one simply inserts the cylindrical portion 44 of the bushing in the axially aligned hole 36 of the threaded collar member 34 before threading the collar member into the support base. The bushing should be inserted into the collar member upside down as shown in the drawings so that the bushing's flange portion 42 is positioned between the collar member and the upper pad 28 when the collar member is threaded into the threaded bore of the support base.

Figure 4:
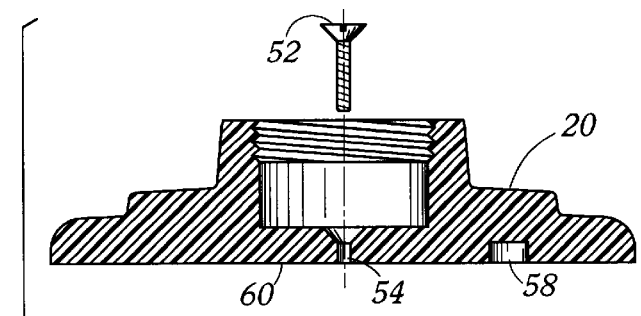
FIG. 4 is a side elevational view of a wall mounting bracket for supporting the base assembly of FIG. 1 on a wall. The support base of the base assembly is shown in cross section.
Figure 5:
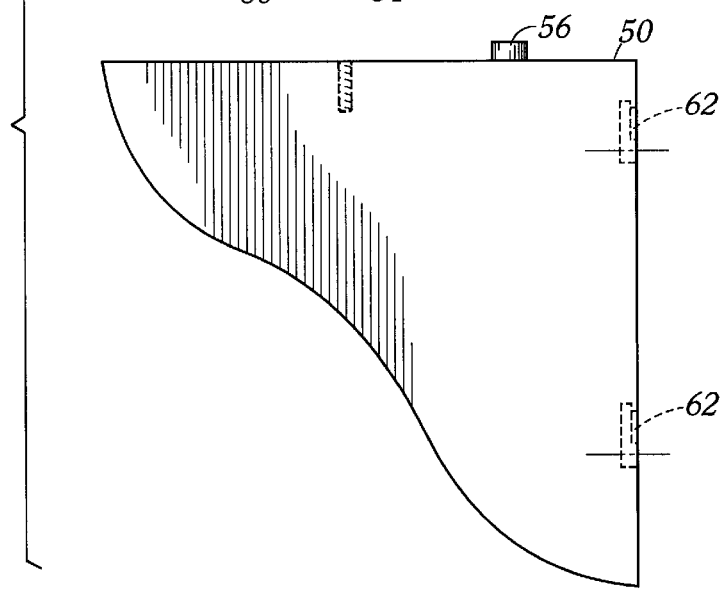
FIG. 5 is an end view of the wall mounting bracket of FIG. 4.
Figure 5:
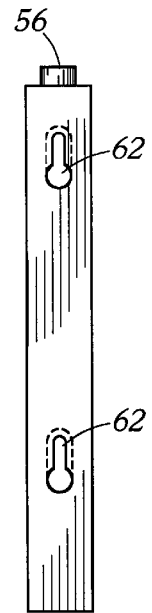

FIG. 4 illustrates a wall mounting bracket 50 for mounting support base 20 onto a wall (not shown). Bracket 50 is secured to the base with a screw 52 which is inserted through a screw hole 54 provided in the bottom of the base 20 and then threaded into the top of the bracket 50 as indicated in FIG. 4. Bracket 50 is also provided with a boss 56 which is received in a bore 58 provided in the bottom 60 of base 20. The mating of the boss in the bore prevents the base from rotating on bracket 50. Conventional key hole slots 62 are also provided in the side of bracket 50 for mounting the bracket to a generally vertically oriented wall provided with screws for being received in the key hole slots as known to those skilled in the art.

The invention has been described in detail with reference to a particular embodiment thereof, but it will be understood that various other modifications can be effected within the spirit and scope of this invention.

We claim:

1. An assembly for protecting and supporting a fragile elongated member having a column and an integral flange base, said assembly comprising:

a protective support base defining a threaded bore for receiving the integral flange base of the fragile elongated member, said threaded bore having a bottom, said flange base having a bottom surface and a top surface with the column projecting upwardly therefrom;

a bottom cushioning pad for placement in the bottom of said bore to cushion and support the flange base of the elongated member when it is received in said bore with its bottom surface positioned against said bottom cushioning pad;

a ring-shaped upper cushioning pad for being positioned against the top surface of the flange base with the column received in the ring hole of the pad; and, a threaded collar member defining an axially aligned hole for receiving the column and for being threaded into said threaded bore of said protective support base to secure the elongated member to the protective support base.

2. An assembly as claimed in claim 1 further comprising a first adapter bushing having a flange portion and a cylindrical portion with said cylindrical portion being received in said axially aligned hole of said threaded collar member and said flange portion being positioned between said collar member and said ring-shaped cushioning pad, said bushing also defining an axially aligned hole having a predetermined diameter for closely receiving the column of a said elongated member to enhance securement of the elongated member to the protective support base.

3. An assembly as claimed in claim 2 wherein said bushing's flange portion is provided with a thickness for compressing the upper and bottom cushioning pads against the elongated member's flange base when said collar is threaded into said threaded bore of said protective base.

4. An assembly for protecting and supporting a fragile elongated member having a column and an integral flange base, said assembly comprising:

a protective support base defining a threaded bore for receiving the integral flange base of the fragile elongated member, said threaded bore having a bottom, said flange base having a bottom surface and a top surface with the column projecting upwardly therefrom;

a bottom cushioning pad for placement in the bottom of said bore to cushion and support the flange base of the elongated member when it is received in said bore with its bottom surface positioned against said bottom cushioning pad;

a ring-shaped upper cushioning pad for being positioned against the top surface of the flange base with the column received in the ring hole of the pad; and, a threaded collar member defining an axially aligned hole for receiving the column and for being threaded into said threaded bore of said protective support base to secure the elongated member to the protective support base when (1) the flange base of said elongated member is received in said threaded bore of said protective support base with said bottom cushioning pad placed in the bottom of said bore and (2) said ring-shaped cushioning pad is positioned against the top surface of the flange base with the column received in the pad's ring hole.

5. An assembly as claimed in claim 4 further comprising a first adapter bushing having a flange portion and a cylindrical portion with said cylindrical portion being received in said axially aligned hole of said threaded collar member and said flange portion being positioned between said collar member and said ring-shaped cushioning pad, said bushing also defining an axially aligned hole having a predetermined diameter for closely receiving the column of a said elongated member having a slightly smaller diameter than said predetermined diameter so as to enhance securement of the elongated member to the protective support base.

6. A combination comprising:
   a fragile elongated member having a column and an integral flange base;
   a protective support base defining a threaded bore in which said integral flange base of the fragile elongated member is received, said threaded bore having a bottom, said flange base having a bottom surface and a top surface with the column projecting upwardly therefrom;
   a bottom cushioning pad placed in the bottom of said threaded bore to cushion and support said bottom surface of said flange base received in said threaded bore;
   a ring-shaped upper cushioning pad placed against said top surface of the flange base with the column received in the ring hole of the pad; and,
   a threaded collar member defining an axially aligned hole in which said column is received, said collar also being threaded into said threaded bore of said protective support base to secure the elongated member to the protective support base.

7. An assembly as claimed in claim 6 further comprising an adapter bushing having a flange portion and a cylindrical portion with said cylindrical portion being received in said axially aligned hole of said threaded collar member and said flange portion being positioned between said collar member and said ring-shaped cushioning pad, said bushing also defining an axially aligned hole having a predetermined diameter for closely receiving the column of a said elongated member having a slightly smaller diameter than said predetermined diameter so as to enhance securement of the elongated member to the protective support base.

8. An assembly as claimed in claim 7 wherein said bushing's flange portion is provided with a thickness for compressing the upper and bottom cushioning pads against the elongated member's flange base when said collar is threaded into said threaded bore of said protective base.

9. A method of protecting and supporting a fragile elongated member having a column and an integral flange base, said assembly comprising:
   providing a fragile elongated member having a column and an integral flange base wherein the flange base has a bottom surface and a top surface with the column projecting upwardly therefrom;
   providing an assembly for protecting and supporting the fragile elongated member wherein the assembly includes:
      a protective support base defining a threaded bore for receiving the integral flange base of the fragile elongated member and wherein the threaded bore has a bottom;
      a bottom cushioning pad for placement in the bottom of the support base's bore to cushion and support the flange base of the elongated member when it is received in the bore with its bottom surface positioned against the bottom cushioning pad;
      a ring-shaped upper cushioning pad for being positioned against the top surface of the flange base with the column received in the ring hole of the pad; and,
      a threaded collar member defining an axially aligned hole for receiving the column and for being threaded into the threaded bore of the protective support base to secure the elongated member to the protective support base;
   placing the bottom cushioning pad in the bottom of the support base's bore;
   fitting the ring-shaped upper cushioning pad over the elongated member's column so that the column is located in the pad's ring hole;
   positioning the fitted upper cushioning pad against the top surface of the elongated member's flange;
   inserting the elongated member's flange base in the threaded bore of the support base so that the flange base's bottom surface is positioned against the bottom cushioning pad placed in the bottom of the threaded bore;
   fitting the threaded collar member over the elongated member's column so that the column is located in the collar's axially aligned hole; and then
   threading the threaded collar member into the support base's threaded bore to secure the elongated member to the protective support base.

10. A method as claimed in claim 9 further comprising the steps of:
    providing a first adapter bushing having a flange portion and a cylindrical portion wherein the bushing also defines an axially aligned hole having a predetermined diameter for closely receiving the column of the elongated member; and,
    inserting the cylindrical portion of the bushing in the axially aligned hole of the threaded collar member so that the bushing's flange portion is positioned between the collar member and said ring-shaped cushioning pad when the collar member is threaded into the threaded bore of the support base.

11. A method as claimed in claim 10 wherein the bushing's flange portion is provided with a thickness for compressing the upper and bottom cushioning pads against the elongated member's flange base when the collar member is threaded into the threaded bore of the protective base and wherein the collar member is threaded into the threaded bore to compress the upper and bottom cushioning pads against the elongated member's flange base.

* * * * *